(12) United States Patent
Gelidan et al.

(10) Patent No.: US 12,536,893 B2
(45) Date of Patent: Jan. 27, 2026

(54) VERSATILE EMERGENCY RESPONSE ACTIVATION SYSTEM UTILIZING SATELLITE TRACKING AND POSITIONING TECHNOLOGY

(71) Applicant: SAUDI ARABIAN OIL COMPANY, Dhahran (SA)

(72) Inventors: Khadija Ahmed Gelidan, Dhahran (SA); Maher Maqbool Shariff, Dhahran (SA); Aisha Muhammed Al Azeb, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 402 days.

(21) Appl. No.: 18/341,608

(22) Filed: Jun. 26, 2023

(65) Prior Publication Data

US 2024/0428676 A1  Dec. 26, 2024

(51) Int. Cl.
*G08B 25/00* (2006.01)

(52) U.S. Cl.
CPC ......... *G08B 25/006* (2013.01); *G08B 25/004* (2013.01)

(58) Field of Classification Search
CPC ............................ G08B 25/006; G08B 25/004
USPC ....................................................... 455/404.1
See application file for complete search history.

(56) References Cited

U.S. PATENT DOCUMENTS

| | | |
|---|---|---|
| 7,711,468 B1 | 5/2010 | Levy |
| 8,321,123 B2 | 11/2012 | Howarter et al. |
| 8,599,039 B2 | 12/2013 | Otero et al. |
| 8,717,193 B2 | 5/2014 | Velusamy |
| 9,861,151 B2 | 1/2018 | Ciaramelletti et al. |
| 10,035,509 B2 | 7/2018 | Vanden Berg et al. |
| 10,081,357 B2 | 9/2018 | Saigusa et al. |
| 10,372,129 B1 | 8/2019 | Urmson et al. |
| 10,467,899 B2 | 11/2019 | Kelgernon |
| 2014/0372015 A1* | 12/2014 | Namm ............... G01C 21/3438 701/117 |
| 2015/0172894 A1* | 6/2015 | Gabel ................... H04W 4/029 455/404.2 |

(Continued)

FOREIGN PATENT DOCUMENTS

CN   103370249 B   8/2016

*Primary Examiner* — Maria El-Zoobi
(74) *Attorney, Agent, or Firm* — Osha Bergman Watanabe & Burton LLP

(57) ABSTRACT

An emergency response activation (ERA) system comprising a graphical user interface (GUI) located at a dashboard of a vehicle, four or more global positioning system (GPS) satellites, a driving center, a 5G-communication control tower, an emergency response center (ERC) system, and 5G-enabled unmanned semi-autonomous aerial vehicles (UAVs). The GUI comprises distinct emergency activation buttons (EABs), each associated with a specific emergency. The GPS satellites provide a precise location of the vehicle associated with the specific emergency. The driving center receives information of the specific emergency via the GPS satellites once the EAB is pressed by an occupant of the vehicle. The 5G-communication control tower transmits the information from the driving center to a specific emergency response center via the GPS satellites. The ERC system dispatches emergency response personnel from the specific emergency response center at the precise location of the vehicle.

20 Claims, 6 Drawing Sheets

(56) References Cited

U.S. PATENT DOCUMENTS

| | | | |
|---|---|---|---|
| 2018/0165945 A1* | 6/2018 | McClendon | G08B 27/005 |
| 2021/0152687 A1* | 5/2021 | Reber | H04L 65/611 |
| 2024/0004381 A1* | 1/2024 | León Ibarra | G05D 1/0094 |
| 2024/0312144 A1* | 9/2024 | Perumalla | G06T 19/006 |
| 2024/0323663 A1* | 9/2024 | Pellegrini | H04W 4/025 |

* cited by examiner

VERSATILE EMERGENCY RESPONSE ACTIVATION SYSTEM UTILIZING SATELLITE TRACKING AND POSITIONING TECHNOLOGY

BACKGROUND

Emergency response activation (ERA) for a vehicle associated with a specific emergency encompasses a wide range of activities. All stages of the ERA depend on the vehicle's location provided by the occupants of the vehicle to the driving center of a company's driving training program. The precise location of the vehicle associated with the specific emergency must be gathered and transmitted to the specific emergency response center to determine the size and scope of the specific emergency and to take the appropriate response. Without a human-error free system which precisely locates the vehicle associated with the specific emergency and activates a response from the specific emergency response center, the occupants of the vehicle must provide the location of the vehicle to a dispatcher at the driving center who in turn relay the information to the specific emergency response center. This may result in the occupants of the vehicle having to guess the location of the vehicle, or the dispatcher at the driving center to call the wrong emergency response center. This may also cost time, money, and lives. Accordingly, there is a need for an ERA system which eliminates human errors in locating the vehicle associated with the specific emergency or in sending the wrong emergency response personnel.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to an emergency response activation (ERA) system. The system comprises a graphical user interface (GUI) located at a dashboard of a vehicle and comprising distinct emergency activation buttons (EABs), four or more global positioning system (GPS) satellites operatively connected to the GUI, a driving center operatively connected to the GPS satellites, a 5G-communication control tower operatively connected to the GPS satellites and the driving center, an emergency response center (ERC) system operatively connected to the GPS satellites and comprising distinct emergency response centers, and 5G-enabled unmanned semi-autonomous aerial vehicles (UAVs) operatively connected to the ERC system. Each of the EABs is associated with a specific emergency. The GPS satellites are configured to provide a precise location of the vehicle associated with the specific emergency. The driving center is configured to receive information of the specific emergency via the GPS satellites once the EAB associated with the specific emergency is pressed by an occupant of the vehicle. The 5G-communication control tower is configured to transmit the information of the specific emergency from the driving center to a specific emergency response center via the GPS satellites. The ERC system is configured to dispatch emergency response personnel of the specific emergency response center at the precise location of the vehicle associated with the specific emergency. The 5G-enabled semi-autonomous UAvs are configured to be dispatched by the specific emergency response center at the precise location of the vehicle associated with the specific emergency where cell signal transmission sites are out of service and to stream videos of the specific emergency to the emergency response personnel of the specific emergency response center.

In general, in one aspect, embodiments disclosed herein relate to a method for an emergency response activation (ERA). The method comprises reporting a specific emergency using a graphical user interface (GUI), which includes distinct emergency activation buttons (EABs) and each of the distinct EABs is associated with a specific emergency, located at a dashboard of a vehicle; providing a precise location of the vehicle associated with the specific emergency using a four or more global positioning system (GPS) satellites operatively connected to the GUI; providing information of the specific emergency via the GPS satellites, to a driving center operatively connected to the GPS satellites, once the EAB associated with the specific emergency is pressed by an occupant of the vehicle; transmitting the information of the specific emergency, using a 5G-communication control tower operatively connected to the GPS satellites and the driving center, from the driving center to a specific emergency response center via the GPS satellites; dispatching emergency response personnel of the specific emergency response center, using an emergency response center (ERC) system operatively connected to the GPS satellites and comprising distinct emergency response centers, at the precise location of the vehicle associated with the specific emergency; dispatching 5G-enabled semi-autonomous unmanned aerial vehicles (UA Vs) operatively connected to the ERC system, by the specific emergency response center, at the precise location of the vehicle associated with the specific emergency where cell signal transmission sites are out of service; and streaming videos of the specific emergency, using the 5G-enabled semi-autonomous UAvs, to the emergency response personnel of the specific emergency response center.

Other aspects and advantages of the claimed subject matter will be apparent from the following description and the appended claims.

DETAILED DESCRIPTION

Figure 1:
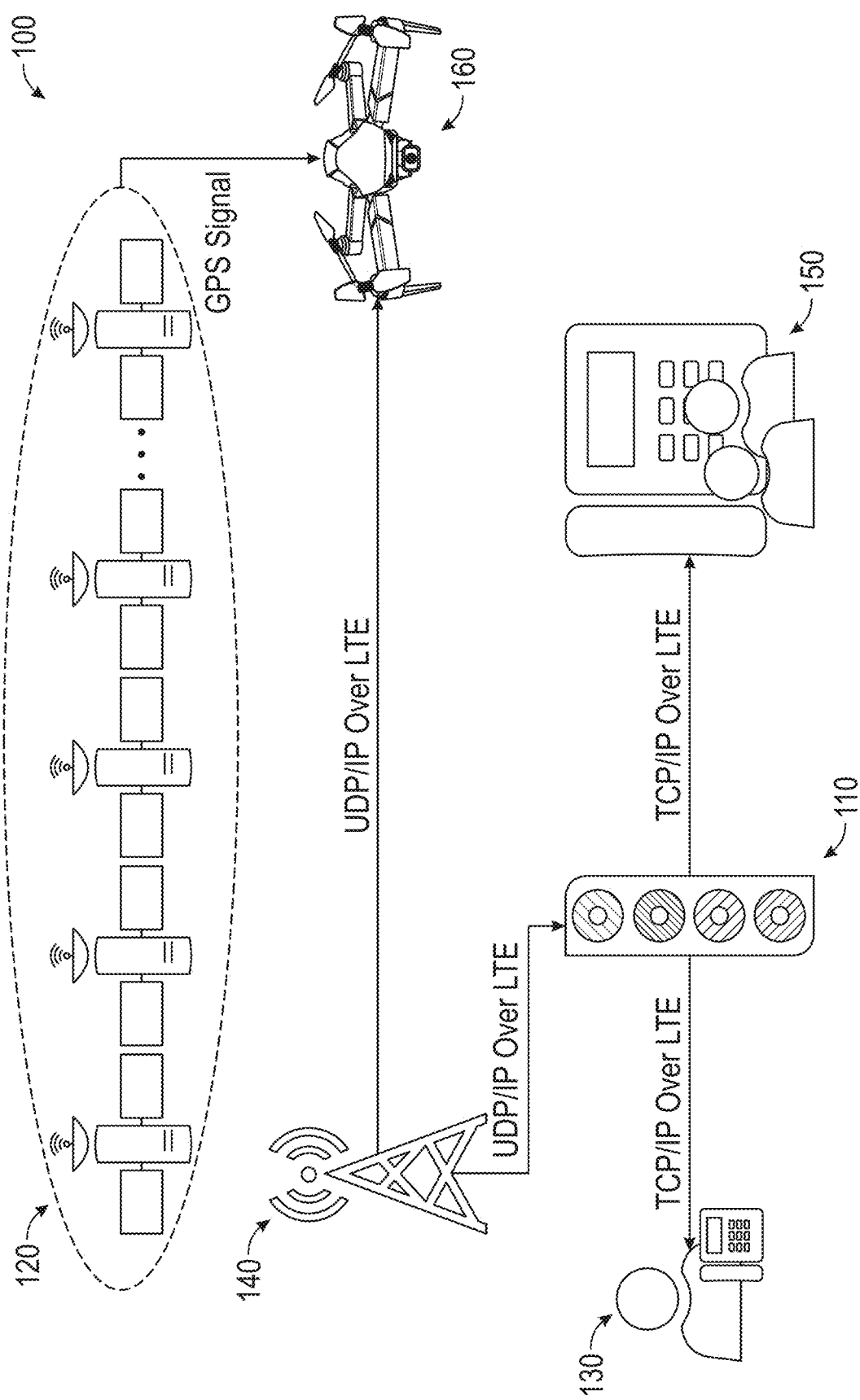
FIG. 1 shows an overview of an emergency response activation (ERA) system utilizing satellite tracking and positioning technology in accordance with one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to a person having ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the disclosure provide an emergency response activation (ERA) system utilizing satellites tracking and positioning technology and a method for an ERA. Emergency response involves activities following a specific emergency to give emergency assistance to victims, to lessen the specific emergency, and to speed recovery actions. Embodiments of the disclosure may provide a precise location of a vehicle associated with a specific emergency and transmit the vehicle's location to specific emergency response centers of a company's driving training program to respond effectively to the specific emergency. Embodiments of the disclosure may provide a fast and efficient response time using 5G-enabled semi-autonomous unmanned aerial vehicles (UVAs) dispatched at the precise location of the vehicle where cell signal transmission sites are out of service. During a specific emergency involving the vehicle of the company's driving training program, it is crucial to have the precise location of the vehicle associated with the specific emergency, at the right time, transmitted to the specific emergency response center, to respond and take the appropriate actions. A detailed description is subsequently provided in reference to the figures.

FIG. 1 shows an overview of an emergency response activation (ERA) system utilizing satellite tracking and positioning technology in accordance with one or more embodiments of the disclosure. The ERA system 100 is versatile and optimizes emergency responses by considerably improving the response time during sudden emergencies associated with a vehicle of a driving center. The ERA system 100 utilizes advanced satellites technology to precisely locate the vehicle associated with the specific emergency and responds to it in a timely manner. For example, GPS technology may be utilized to precisely identify the exact location of the vehicle associated with the specific emergency. The ERA system 100 capitalizes on the 5G-enabled semi-autonomous unmanned aerial vehicles (UAVs) to provide swift emergency responses which positively impact the safety and the security of occupants of the vehicle. The ERA system 100 also protects the assets of the driving center.

The ERA system 100 includes a graphical user interface (GUI) 110, a global positioning system (GPS) satellites 120, a driving center 130, a 5G-communication control tower 140, an emergency response center (ERC) system 150, and at least one 5G-enabled semi-autonomous unmanned aerial vehicle (UAVs) 160. Each of these components is subsequently described.

The GUI 110 is operatively connected to the GPS satellites 120. In one or more embodiments, the GUI 110 is disposed at/in the dashboard of the vehicle and includes distinct emergency activation buttons (EABs). In alternate embodiments, the GUI may be integrated into a tablet or electronic interface in the vehicle. Each of the EABs is associated with a specific emergency type. Each of these EABs is subsequently described in FIG. 2.

The GPS satellites 120 are operatively connected to the GUI 110, the driving center 130, the 5G-communication control tower 140, and the ERC system 150. The GPS satellites 120 include four or more GPS satellites configured to provide a precise location of the vehicle associated with the specific emergency. The GPS satellites 120 are further configured to provide information to the emergency response personnel related to the track of the vehicle associated with the specific emergency, the time of occurrence for the specific emergency, a shorter path to the precise location of the vehicle associated with the specific emergency, and an estimated time of arrival for the emergency response personnel.

The driving center 130 is operatively connected to the GPS satellites 120 and the 5G-communication control tower 140. The driving center 130 is configured to receive information of the specific emergency via the GPS satellites 120 once the EAB associated with the specific emergency is pressed by an occupant of the vehicle. For example, the driving center 130 may be a driving school of a company which has a fleet of vehicles. For example, the driving school may be designated to train candidates opting to learn how to drive and obtain a driving license.

The 5G-communication control tower 140 is operatively connected to the GPS satellites 120 and the driving center 130. The 5G-communication control tower 140 is configured to transmit the information of the specific emergency from the driving center 130 to a specific emergency response center of the ERC system 150 via the GPS satellites 120.

The ERC system 150 is operatively connected to the GPS satellites 120 and includes distinct emergency response centers. The ERC system 150 is configured to dispatch the emergency response personnel of the specific emergency response center at the precise location of the vehicle associated with the specific emergency. Each of these emergency response centers is subsequently described in FIG. 4.

The 5G-enabled semi-autonomous UAVs 160 are operatively connected to the ERC system 150. The 5G-enabled semi-autonomous UAVs 160 are operatively connected to the ERC system 150. In one or more embodiments of the disclosure, the 5G-enabled semi-autonomous UAVs 160 may be multi-rotor UAVs. For example, the 5G-enabled semi-autonomous UAVs 160 may be quadcopters. In one or more embodiments of the disclosure, the 5G-enabled semi-autonomous UAVs 160 may be hybrid UAVs with longer flight time. For example, the 5G-enabled semi-autonomous UAVs 160 may be fixed-Wing hybrid vertical takeoff and landing (VTOL) which have the stability of fixed-wing UAVs as well as the ability to hover, take off and land vertically. The 5G-enabled semi-autonomous UAVs 160 are subsequently described in FIG. 5.

In one or more embodiments, the components of the ERA 100 shown in FIG. 1 are remotely located from each other and are wirelessly connected. For example, the GUI 110 is wirelessly connected to the driving center 130 and the ERC system 150 via Transmission Control Protocol/Internet Protocol (TCP/IP) over Long-Term Evolution (LTE) wireless-based network. For example, the 5G-communication control tower 140 is wirelessly connected to the GUI 110 and the 5G-enabled semi-autonomous UAVs 160 via User Datagram Protocol/Internet Protocol (UDP/IP) over LTE. For example, the GPS satellites 120 are wirelessly connected to the 5G-enabled semi-autonomous UAVs 160 via GPS signal. LTE offers high spectral efficiency, low latency, and high peak data rates. For example, LTE may provide significantly increased peak data rates with the potential for 100 Mbps downstream and 30 Mbps upstream, reduced latency, and scalable bandwidth capacity.

Figure 2:
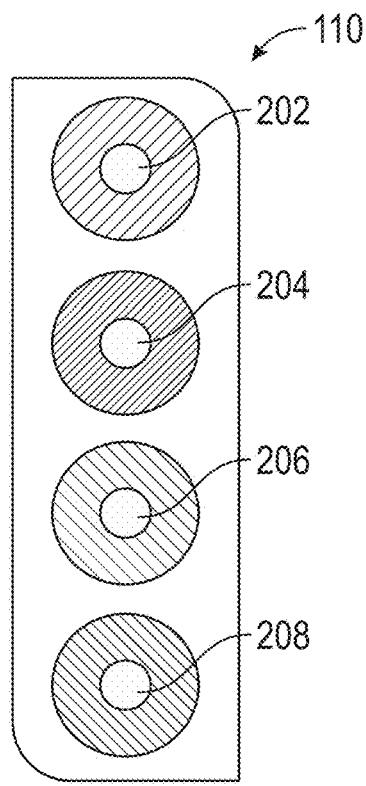
FIG. 2 shows a block diagram of a graphical user interface (GUI) of the ERA system in accordance with one or more embodiments of the disclosure.

Those skilled in the art will appreciate that the above communication protocols are examples of how the various components of FIG. 1 may communicate and connect. However, there may be other protocols, now known or later developed, that may be used to achieve the same purpose without departing from the scope disclosed herein, such as for example, IoT protocols. FIG. 2 shows a block diagram of a graphical user interface (GUI) of the ERA system in accordance with one or more embodiments of the disclosure. The GUI 110 comprises a medical EAB 202, a traffic accident EAB 204, a fire EAB 206, and a life-threatening EAB 208. The EABs are distinct from each other and are easily recognizable by the occupants of the vehicle 300. The occupant of the vehicle may be a driving instructor or a trainee. Each EAB is associated with a specific emergency. The medical EAB 202 is associated with medical emergencies of the occupants of the vehicle, the traffic accident EAB 204 is associated with traffic accidents involving the vehicle, the fire EAB 206 is associated with fire involving the vehicle, and the life-threatening EAB 208 is associated with life-threatening situations involving the vehicle.

The EABs, in one or more embodiments, include analogue EABs. The EABs, in one or more embodiments, include digital touch screen EABs incorporated in the dashboard of the vehicle. For example, a software application may be incorporated in the LED dashboard console of the vehicle 300 to provide the digital touch screen EABs. For example, the software application code may be written in format suited for a versatile of operating system platforms, such as Apple IOS, Android, or any other operating system environment.

The GUI 110 is preferably located at the dashboard of a vehicle. For example, the GUI 110 may be located inside the vehicle at any position easily accessible by an occupant of the vehicle.

Figure 3:
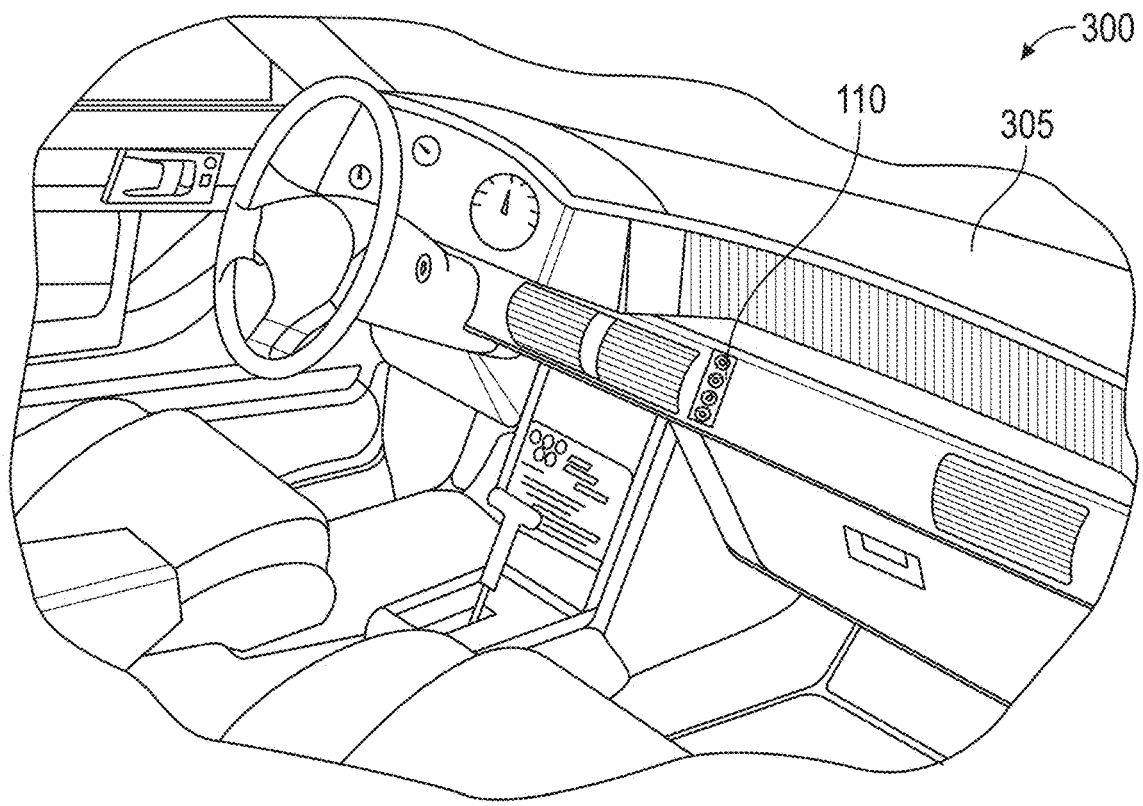
FIG. 3 shows an illustration of the GUI of the ERA system inside a vehicle in accordance with one or more embodiments of the disclosure.

FIG. 3 shows an illustration of the GUI of the ERA system inside a vehicle in accordance with one or more embodiments of the disclosure. The illustration of the inside of the vehicle 300 shows the GUI 110 located at the dashboard 305. Those skilled in the art will appreciate that the location of the GUI 110 is not limited to the dashboard 305 of the vehicle 300. For example, the GUI 110 may be located inside the vehicle 300 at any position easily accessible by an occupant of the vehicle 300 (e.g., driving instructor or a trainee). The vehicle 300 may be any vehicle capable of accommodating the GUI 110. For example, the vehicle 300 may be an electric vehicle, a hybrid vehicle, or a hydrogen/fuel cell drive vehicle. The GUI 110 is powered by the electric system of the vehicle 300. The GUI 110 includes an emergency battery backup system.

Figure 4:
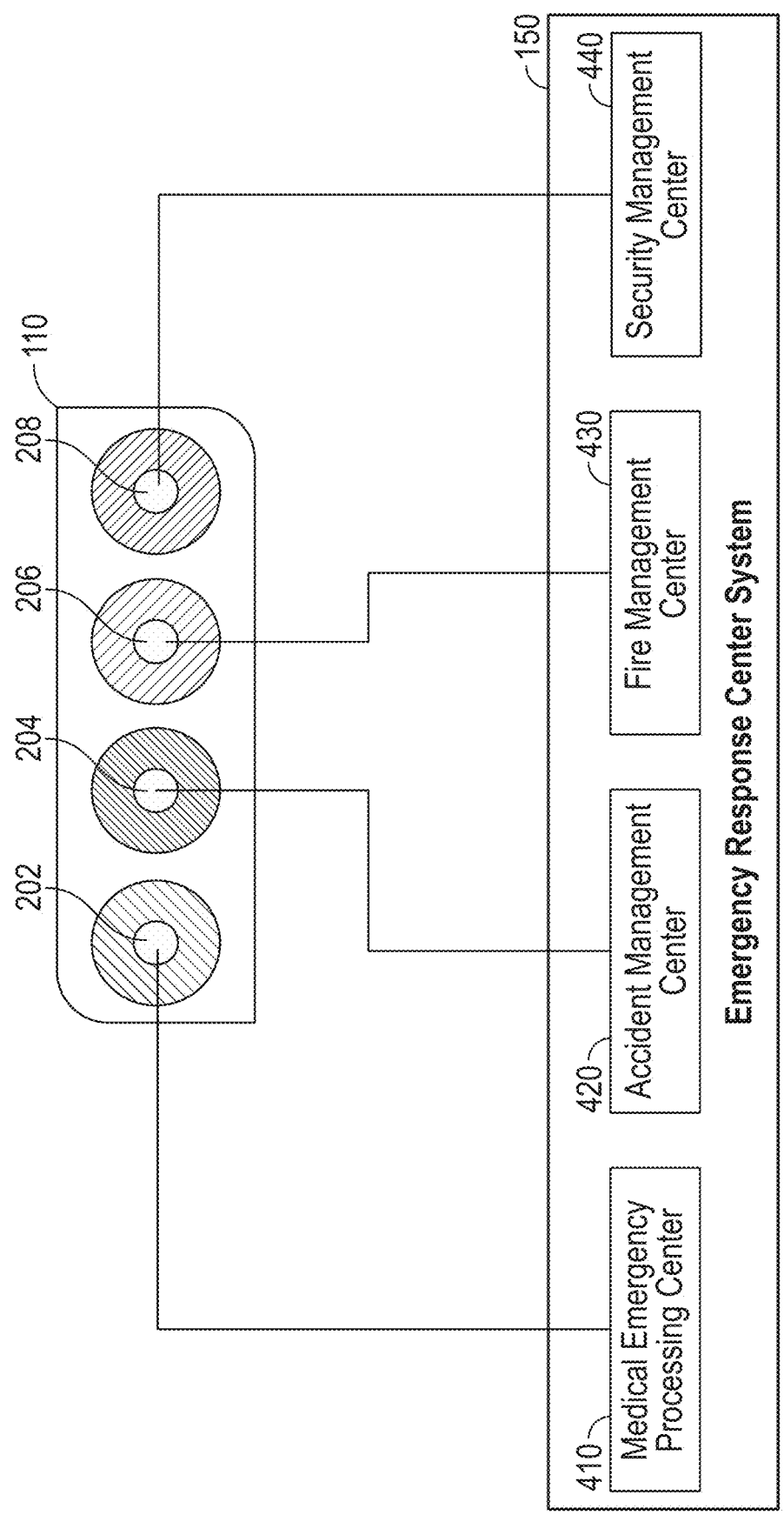
FIG. 4 shows a block diagram of an emergency response center (ERC) system of the ERA system in accordance with one or more embodiments of the disclosure.

FIG. 4 shows a block diagram of the ERC system of the ERA system in accordance with one or more embodiments of the disclosure. The ERC system 150 comprises distinct emergency response centers. The emergency response centers comprise a medical emergency processing center 410 associated with medical emergencies of the occupant of the vehicle, an accident management center 420 associated with traffic accidents involving the vehicle, a fire management center 430 associated with fire involving the vehicle, and a security management center 440 associated with life-threatening situations involving the vehicle. The medical EAB 202 is operatively connected to the medical emergency processing center 410. The traffic accident EAB 204 is operatively connected to the accident management center 420. The fire EAB 206 is operatively connected to the fire management center 430. The life-threatening EAB 208 is operatively connected to the security management center 440. Each of the EABs once pressed by an occupant of the vehicle associated with the specific emergency activates the specific emergency response center responsible for that specific emergency.

Figure 5:
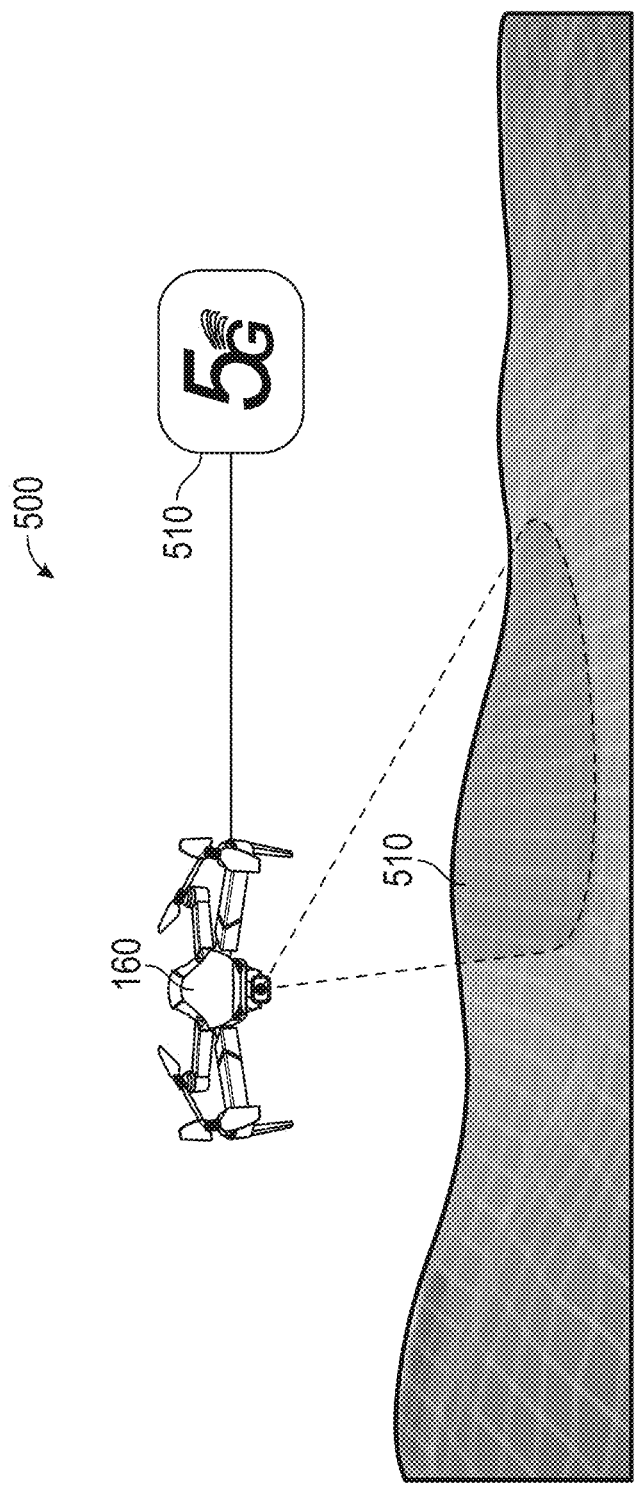
FIG. 5 shows an illustration of 5G-enabled unmanned aerial vehicles (UVAs) of the ERA system in accordance with one or more embodiments of the disclosure.

FIG. 5 shows an illustration of 5G-enabled unmanned aerial vehicles (UVAs) of the ERA system in accordance with one or more embodiments of the disclosure. The 5G-enabled semi-autonomous UAVs 160 are UAV-based radio access networks (RANs) which integrate communication devices mounted onboard into 5G networks. The 5G-enabled semi-autonomous UAVs 160 operate as UAV-based stations to increase the coverage area, balance traffic load, and enhance network capacity. The 5G-enabled semi-autonomous UAVs 160, also called 5G-enabled semi-autonomous drones 160, usage is of vital importance in emergency response situations in remote areas. The 5G-enabled semi-autonomous UAVs 160 may provide crucial support in search and rescue operations and remote monitoring of a vehicle associated with a specific emergency by providing a bird's eye view that is often difficult to obtain otherwise.

The 5G-enabled semi-autonomous UAVs 160 may provide a fast and efficient response time. The 5G-enabled semi-autonomous UAVs 160 are configured to be dispatched by the specific emergency response center at the precise location (emergency site 505) of the vehicle associated with the specific emergency where cell signal transmission sites are out of service. The 5G-enabled semi-autonomous UAVs 160 may identify and locate the vehicle associated with the specific emergency in areas that may be inaccessible to emergency response personnel (e.g., search and rescue teams). For example, the 5G-enabled semi-autonomous UAVs 160 may be dispatched to assess the damage, take videos of the damage, and stream the videos of the specific emergency back to the emergency response personnel of the specific emergency response center.

The 5G-enabled semi-autonomous UAVs 160 may be equipped with cameras and other sensors that can provide real-time footage of the vehicle associated with the specific emergency, allowing emergency response personnel (e.g., rescue teams) to make more informed decisions. The 5G-enabled semi-autonomous UAVs 160 may have time-of-flight (TOF) sensors, magnetic-field change sensors, light-pulse distance sensors, thermal and chemical sensor orientation sensors, airspeed sensors, gyroscopes, accelerometers, magnetometers (compasses) and barometers, and detection sensors. For example, the emergency response personnel may be police officers, firefighters, medical personnel that need to figure out what remedy is needed.

The 5G-enabled semi-autonomous UAVs 160 may be remotely or autonomously controlled. The 5G-enabled semi-autonomous UAVs 160 comprises a radio control (RC) system to manually control the 5G-enabled semi-autonomous UAVs 160 from a handheld transmitter. The RC system has a ground-based remote-control unit that is used by the operator to command the 5G-enabled semi-autonomous UAVs 160. The remote-control unit has physical controls that can be used to specify 5G-enabled semi-autonomous UAVs 160 movement (e.g., speed, direction, throttle, yaw, pitch, roll, etc.) and to enable autopilot flight modes (e.g., takeoff, land, return to land, mission etc.).

The 5G-enabled semi-autonomous UAVs 160 include a 5G-enabled semi-autonomous UAV pilot which provides a 5G network 510 (multi-UAV network such as Internet of Things (IoT) devices in farmlands) to provide wireless coverage to emergency personnel in remote areas, where the traditional cellular networks are sparse or unavailable. The 5G-enabled semi-autonomous UAV pilot is configured to fly at a predetermined altitude of the precise location of the vehicle associated with the specific emergency and transmit a 5G network 510 coverage over a predetermined area enclosing the precise location (emergency site 505) of the vehicle associated with the specific emergency and provide faster download and upload speeds. For example, the 5G-enabled semi-autonomous UAV pilot may be a hand-held UAV which can fly at altitudes of less than 600 m and has a range of less than 2 km. For example, the 5G-enabled semi-autonomous UAV pilot may fly at an altitude of 100 meters up in the air and may begin to transmit 5G coverage over roughly 3 square kilometers.

The 5G network 510 is an important tool in disaster-response efforts, whether those are local or widespread events. The 5G network 510 may process large data quickly through larger radio frequency channels and targeted cell towers. The 5G network 510 may help emergency response personnel stream video and communicate with each other faster, offers internet and telephone connectivity during power outages, and enables new technology that will help emergency response personnel do their jobs more efficiently. For example, video and two-way communications are especially meaningful 5G network 510 applications. The 5G network 510 fast speeds and lower latency mean videos can stream faster, downloads are quicker, and communication is practically instantaneous. The 5G network 510 features may be useful for emergency response personnel who survey the precise location of the vehicle associated with the specific emergency and need to communicate with each other as quickly as possible. For example, in a fire emergency involving the vehicle, the 5G network 510 may allow the body camera of each firefighter to be transmitted to a central location and could map the location of each firefighter. The 5G network 510 may allow the fire management center 430 to consider much more information as they prepare their emergency response. The fire management center 430 may be able to deploy the emergency response personnel and equipment more efficiently.

Figure 6:
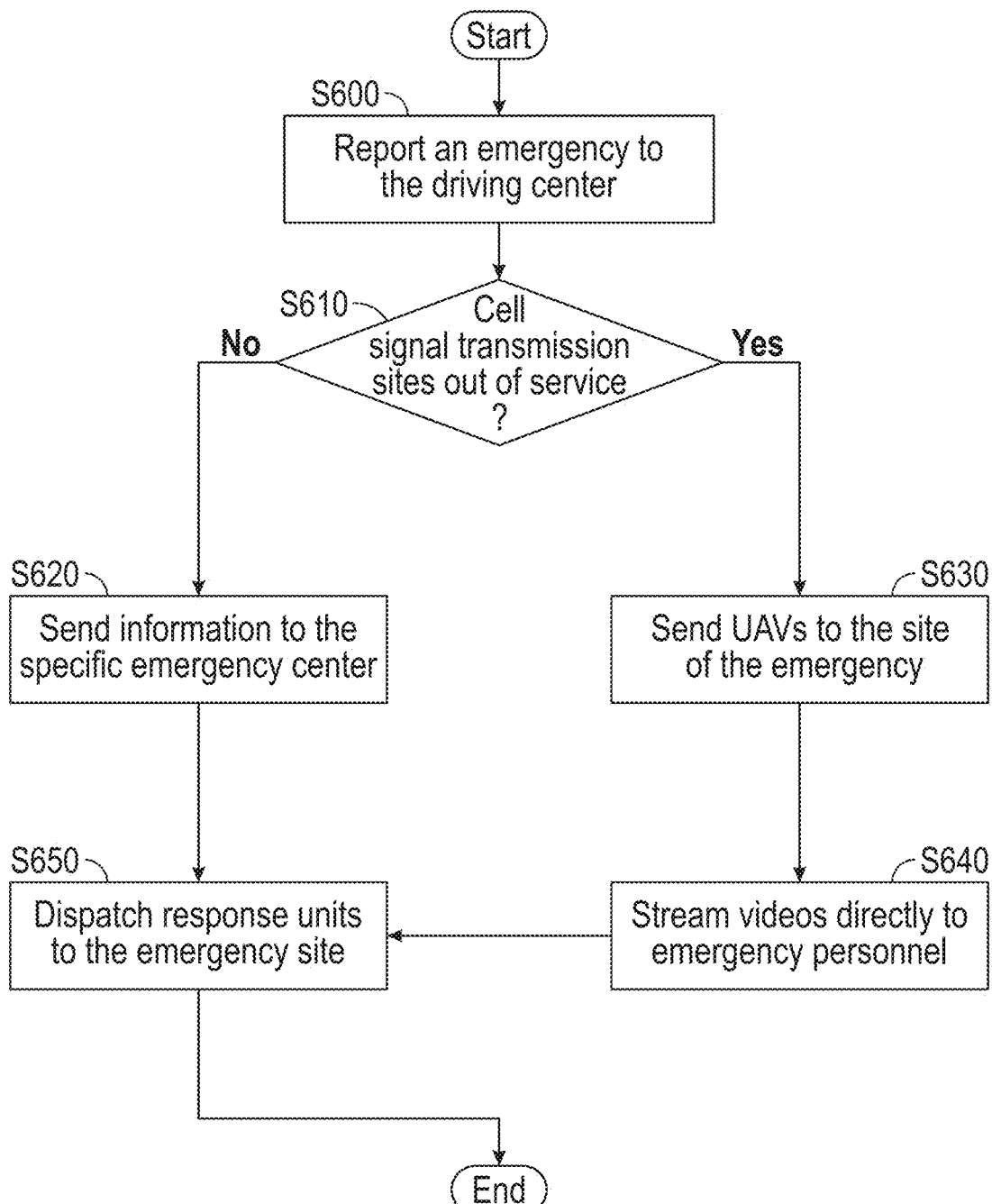
FIG. 6 shows a flowchart of a process for an emergency response activation (ERA) utilizing satellite tracking and positioning technology in accordance with one or more embodiments of the disclosure.
Figure 7A:
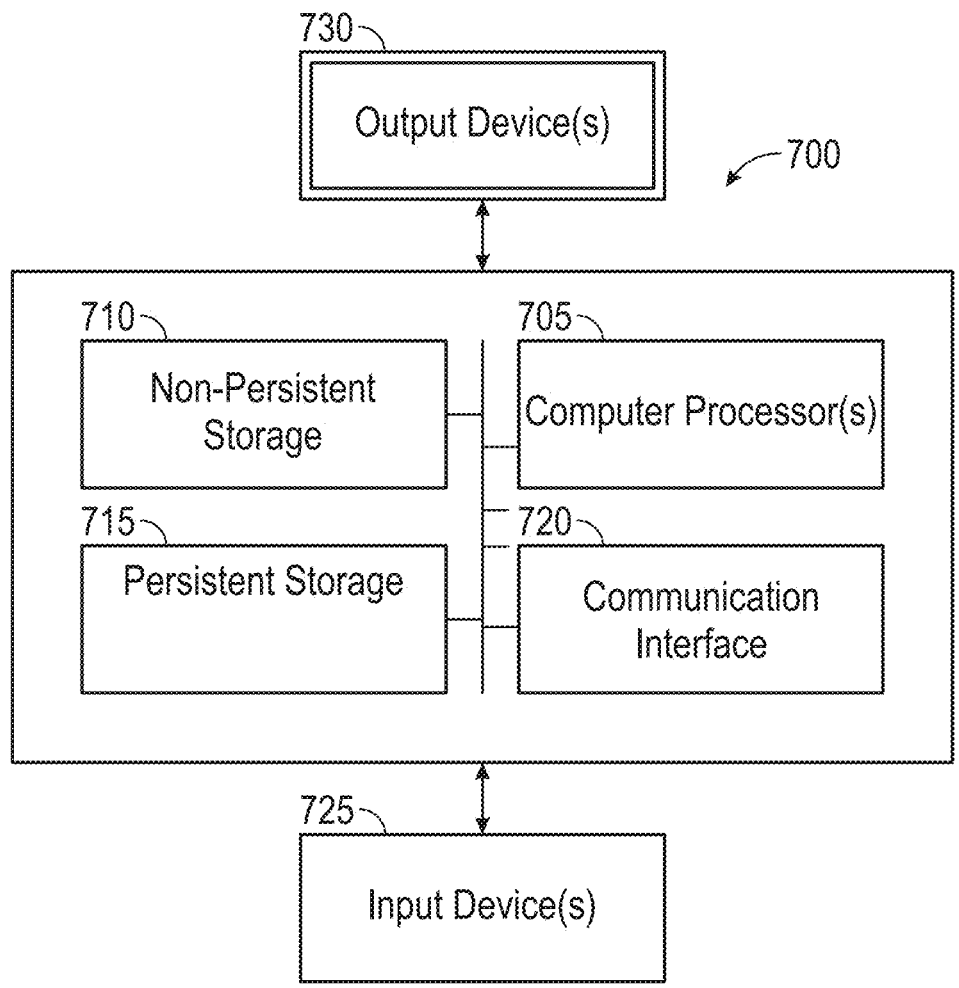
FIGS. 7A and 7B show a computing system in accordance with one or more embodiments of the disclosure.

FIG. 6 shows a flowchart of a process for the ERA utilizing satellite tracking and positioning technology utilizing satellite tracking and positioning technology in accordance with one or more embodiments of the disclosure. The process for the ERA utilizing satellite tracking and positioning technology utilizing satellite tracking and positioning technology may be performed on a computer system, as shown in FIG. 7A.

In step S600, a specific emergency is reported to the driving center 130. via the GUI 110 described above. For example, the driving center 130 receives information of the specific emergency via the GPS satellites 120 once the EAB associated with the specific emergency is pressed by an occupant of the vehicle.

In step S610, a determination is made by the driving center 130 on whether cell signal transmission sites are out of service around the precise location of the vehicle associated with the specific emergency.

In step S620, based on determining that the cell signal transmission sites are in service the 5G-communication control tower 140 transmits the information of the specific emergency from the driving center 130 to the specific emergency response center via the GPS satellites 120.

In step S630, based on determining that the cell signal transmission sites are out of service, the 5G-enabled semi-autonomous UAVs 160 are dispatched by the specific emergency response center at the precise location of the vehicle associated with the specific emergency.

In step S640, the dispatched 5G-enabled semi-autonomous UAVs 160 assess the damage, take videos of the damage, and stream the videos of the specific emergency back to the emergency response personnel of the specific emergency response center.

In step S650, the specific emergency response center dispatches the emergency response personnel of the specific emergency response center at the precise location of the vehicle associated with the specific emergency to provide emergency assistance for victims, stabilize the situation and reduce the probability of secondary damage, and to and to speed recovery operations.

Figure 7B:
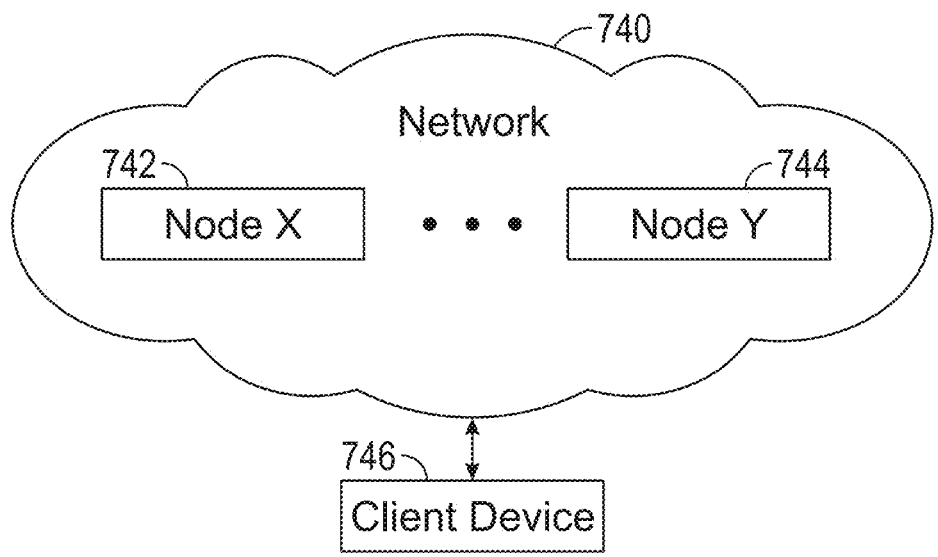

FIGS. 7A and 7B show a computing system in accordance with one or more embodiments of the disclosure. The process for the ERA utilizing satellite tracking and positioning technology may be performed on a computing system, as shown in FIGS. 7A and 7B. Any combination of mobile, desktop, server, router, switch, embedded device, or other types of hardware may be used. For example, the computing system 700 may include one or more computer processor(s) 705, a non-persistent storage 710 (e.g., volatile memory, such as random access memory (RAM), cache memory), a persistent storage 715 (e.g., a hard disk, an optical drive such as a compact disk (CD) drive or digital versatile disk (DVD) drive, a flash memory, etc.), a communication interface 720 (e.g., Bluetooth interface, infrared interface, network interface, optical interface, etc.), and numerous other elements and functionalities.

The computer processor(s) 705 may be an integrated circuit for processing instructions. For example, the computer processor(s) 705 may be one or more cores or micro-cores of a processor. The computing system 700 may also include one or more input device(s) 725, such as a touchscreen, keyboard, mouse, microphone, touchpad, electronic pen, or any other type of input device.

The communication interface 720 may include an integrated circuit for connecting the computing system 700 to a network (not shown) (e.g., a local area network (LAN), a wide area network (WAN) such as the Internet, mobile network, or any other type of network) and/or to another device, such as another computing device.

The computing system 700 may further includes one or more output device(s) 730, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input device(s) 725 and the output device(s) 730 may be locally or remotely connected to the computer processor(s) 705, the non-persistent storage 710, and the persistent storage 715. Many different types of computing systems exist, and the aforementioned input device(s) 725 and output device(s) 730 may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system 700 in FIG. 7A may be connected to or be a part of a network. For example, as shown in FIG. 7B, the network 740 may include multiple nodes (e.g., node X 742, node Y 744). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system 700 may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 742, node Y 744) in the network 740 may be configured to provide services for a client device 746. For example, the nodes may be part of a cloud computing system. The nodes may include functionality to receive requests from the client device 746 and transmit responses to the client device 746. The client device 746 may be a computing system, such as the computing system shown in FIG. 7A. Further, the client device 746 may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may be executed on the same or different computing system.

Rather than or in addition to sharing data between processes, the computing system 700 performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor(s) 705. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system 700, in performing one or more embodiments of the disclosure, may extract one or more data items from the obtained data. For example, the extraction may be performed as follows by the computing system 700 in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system 700 of FIG. 7A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system 700 of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system 700 of FIG. 7A and the nodes and/or client device 746 in FIG. 7B. Other functions may be performed using one or more embodiments of the disclosure.

Embodiments of the disclosure may help in expediting calls with emergency response centers in the most efficient manner using advanced satellite technologies. Embodiments of the disclosure are swift and precise in providing emergency calls depending on the situation confronted with. Embodiments of the disclosure may help in mitigating crucial time by utilizing the ERA system to get the exact help needed for the specific emergency.

Embodiments of the disclosure provide a fast and efficient response time with the use of 5G-enabled semi-autonomous UAVs in remote areas where cell signal transmission sites are out of service. The 5G network may process large data quickly through larger radio frequency channels and targeted cell towers. The 5G network may help emergency response personnel stream video and communicate with each other faster, may offer internet and telephone connectivity during power outages, and may enable new technology that will help emergency response personnel do their jobs more efficiently.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. An emergency response activation (ERA) system, the system comprising:
   a graphical user interface (GUI) located at a dashboard of a vehicle and comprising distinct emergency activation buttons (EABs), wherein each of the EABs is associated with a specific emergency;
   four or more global positioning system (GPS) satellites operatively connected to the GUI, wherein the GPS satellites are configured to provide a precise location of the vehicle associated with the specific emergency;
   a driving center operatively connected to the GPS satellites, wherein the driving center is configured to receive information of the specific emergency via the GPS satellites once the EAB associated with the specific emergency is pressed by an occupant of the vehicle;
   a 5G-communication control tower operatively connected to the GPS satellites and the driving center, wherein the 5G-communication control tower is configured to transmit the information of the specific emergency from the driving center to a specific emergency response center via the GPS satellites;
   an emergency response center (ERC) system operatively connected to the GPS satellites and comprising distinct emergency response centers, wherein the ERC system is configured to dispatch emergency response personnel of the specific emergency response center at the precise location of the vehicle associated with the specific emergency; and
   5G-enabled unmanned semi-autonomous aerial vehicles (UAVs) operatively connected to the ERC system, wherein the 5G-enabled semi-autonomous UAvs are configured to:
     be dispatched by the specific emergency response center at the precise location of the vehicle associated with the specific emergency where cell signal transmission sites are out of service; and
     stream videos of the specific emergency to the emergency response personnel of the specific emergency response center.

2. The ERA system according to claim 1, wherein the emergency response centers comprise:
   a medical emergency processing center associated with medical emergencies of the occupant of the vehicle;
   an accident management center associated with traffic accidents involving the vehicle;
   a fire management center associated with fire involving the vehicle; and
   a security management center associated with life-threatening situations involving the vehicle.

3. The ERA system according to claim 2, wherein the EABs comprise:
   a medical EAB operatively connected to the medical emergency processing center;
   a traffic accident EAB operatively connected to the accident management center;
   a fire EAB operatively connected to the fire management center; and
   a life-threatening EAB operatively connected to the security management center.

4. The ERA system according to claim 3, wherein the EABs further comprises analogue EABs.

5. The ERA system according to claim 3, wherein the EABs further comprises digital touch screen EABs incorporated in the dashboard of the vehicle.

6. The ERA system according to claim 4, wherein the GPS satellites are further configured to provide the emergency response personnel:
   a track of the vehicle associated with the specific emergency;
   information related to:
     a time of occurrence for the specific emergency,
     a shorter path to the precise location of the vehicle associated with the specific emergency, and
     an estimated time of arrival for the emergency response personnel.

7. The ERA system according to claim 6, wherein the 5G-enabled semi-autonomous UAVs comprise a 5G-enabled semi-autonomous UAV pilot which is configured to:
   fly at a predetermined altitude of the precise location of the vehicle associated with the specific emergency;
   transmit 5G network coverage over a predetermined area enclosing the precise location of the vehicle associated with the specific emergency; and
   provide faster download and upload speeds.

8. The ERA system according to claim 5, wherein the GPS satellites is further configured to provide the emergency response personnel:
   a track of the vehicle associated with the specific emergency;
   information related to:
     a time of occurrence for the specific emergency, a shorter path to the precise location of the vehicle associated with the specific emergency, and
an estimated time of arrival for the emergency response personnel.

9. The ERA system according to claim 8, wherein the 5G-enabled semi-autonomous UAVs comprise a 5G-enabled semi-autonomous UAV pilot which is configured to:
fly at a predetermined altitude of the precise location of the vehicle associated with the specific emergency;
transmit 5G network coverage over a predetermined area enclosing the precise location of the vehicle associated with the specific emergency.

10. The ERA system according to claim 1, wherein the GUI is powered by an electric system of the vehicle and further comprises an emergency battery backup system.

11. A method for an emergency response activation (ERA), the method comprises:
reporting a specific emergency using a graphical user interface (GUI) located at a dashboard of a vehicle, wherein the GUI comprises distinct emergency activation buttons (EABs) and each of the distinct EABs is associated with a specific emergency;
providing a precise location of the vehicle associated with the specific emergency using four or more global positioning system (GPS) satellites operatively connected to the GUI;
providing information of the specific emergency via the GPS satellites, to a driving center operatively connected to the GPS satellites, once the EAB associated with the specific emergency is pressed by an occupant of the vehicle;
transmitting the information of the specific emergency, using a 5G-communication control tower operatively connected to the GPS satellites and the driving center, from the driving center to a specific emergency response center via the GPS satellites;
dispatching emergency response personnel of the specific emergency response center, using an emergency response center (ERC) system operatively connected to the GPS satellites and comprising distinct emergency response centers, at the precise location of the vehicle associated with the specific emergency;
dispatching 5G-enabled semi-autonomous unmanned aerial vehicles (UAVs) operatively connected to the ERC system, by the specific emergency response center, at the precise location of the vehicle associated with the specific emergency where cell signal transmission sites are out of service; and
streaming videos of the specific emergency, using the 5G-enabled semi-autonomous UAvs, to the emergency response personnel of the specific emergency response center.

12. The method according to claim 11, wherein the emergency response centers comprise:
a medical emergency processing center associated with medical emergencies of the occupant of the vehicle;
an accident management center associated with traffic accidents involving the vehicle;
a fire management center associated with fire involving the vehicle; and
a security management center associated with life-threatening situations involving the vehicle.

13. The method according to claim 12, wherein the EABs comprise:
a medical EAB operatively connected to the medical emergency processing center;
a traffic accident EAB operatively connected to the accident management center;
a fire EAB operatively connected to the fire management center; and
a life-threatening EAB operatively connected to the security management center.

14. The method according to claim 13, wherein the EABs further comprise analogue EABs.

15. The method according to claim 13, wherein the EABs further comprise digital touch screen EABs incorporated in the dashboard of the vehicle.

16. The method according to claim 14, wherein the method further comprises:
providing, by the GPS satellites, the emergency response personnel:
a track of the vehicle associated with the specific emergency; and
information related to:
a time of occurrence for the specific emergency,
a shorter path to the precise location of the vehicle associated with the specific emergency, and
an estimated time of arrival for the emergency response personnel.

17. The method according to claim 16, wherein the method further comprises:
flying, a 5G-enabled semi-autonomous UAV pilot amongst the 5G-enabled semi-autonomous UAVs, at a predetermined altitude of the precise location of the vehicle associated with the specific emergency;
transmitting, by the 5G-enabled semi-autonomous UAV pilot, 5G network coverage over a predetermined area enclosing the precise location of the vehicle associated with the specific emergency; and
providing, by the 5G-enabled semi-autonomous UAV pilot, faster download and upload speeds.

18. The method according to claim 15, wherein the method further comprises:
providing, by the GPS satellites, the emergency response personnel:
a track of the vehicle associated with the specific emergency; and
information related to:
a time of occurrence for the specific emergency,
a shorter path to the precise location of the vehicle associated with the specific emergency, and
an estimated time of arrival for the emergency response personnel.

19. The method according to claim 18, wherein the method further comprises:
flying, a 5G-enabled semi-autonomous UAV pilot amongst the 5G-enabled UAVs, at a predetermined altitude of the precise location of the vehicle associated with the specific emergency;
transmitting, by the 5G-enabled semi-autonomous UAV pilot, 5G network coverage over a predetermined area enclosing the precise location of the vehicle associated with the specific emergency; and
providing, by the 5G-enabled semi-autonomous UAV pilot, faster download and upload speeds.

20. The method according to claim 16, wherein the method further comprises:
powering the GUI using an electric system of the vehicle; and
providing an emergency battery backup system to the GUI.

* * * * *